United States Patent [19]

Takahashi et al.

[11] Patent Number: 4,673,439

[45] Date of Patent: Jun. 16, 1987

[54] SIZING AGENT FOR PAPER MAKING

[75] Inventors: Yoshio Takahashi; Shigeto Hatanaka, both of Kanagawa, Japan

[73] Assignee: Mitsubishi Oil Co., Ltd., Tokyo, Japan

[21] Appl. No.: 839,388

[22] Filed: Mar. 14, 1986

[30] Foreign Application Priority Data

Mar. 15, 1985 [JP] Japan .................. 60-50519

[51] Int. Cl.[4] .................. D21D 3/00; C08L 3/00
[52] U.S. Cl. .................. 106/287.24; 106/177; 106/213; 162/158
[58] Field of Search .................. 106/287.24, 177, 238; 528/186; 162/158

[56] References Cited

U.S. PATENT DOCUMENTS

| | | | |
|---|---|---|---|
| 3,056,744 | 10/1962 | Copes et al. ................ | 558/186 |
| 3,518,184 | 6/1970 | Potter ................ | 558/186 |
| 4,576,680 | 3/1986 | Kawatani ................ | 162/158 |

Primary Examiner—Theodore Morris
Attorney, Agent, or Firm—Sughrue, Mion, Zinn, Macpeak & Seas

[57] ABSTRACT

A sizing agent for paper making is described, comprising (A) a reaction product obtained by an addition reaction of an olefin having 14 to 20 carbon atoms or a mixture thereof with maleic anhydride and (B) one or more emulsifiers selected from polyoxyalkylene aralkylaryl ether phosphoric acid esters or salts thereof.

20 Claims, No Drawings

SIZING AGENT FOR PAPER MAKING

FIELD OF THE INVENTION

The present invention relates to a sizing agent for paper making. More specifically, it relates to a sizing agent for paper making which forms a good aqueous emulsion and shows an excellent sizing effect even if it is preserved for a long period of time in the presence of an addition reaction product of an olefin with maleic anhydride and an emulsifier.

BACKGROUND OF THE INVENTION

In the production of paper, generally, a large amount of filler such as talc, clay, etc., has been used for improving printability and whiteness or giving opacity. Recently, calcium carbonate which is available at a low price has been employed in place of the above-described fillers.

However, when calcium carbonate is used as the filler, there is a disadvantage in that calcium carbonate decomposes due to the acidity of the paper making system, i.e., anion type sizing agents, such as rosin size, etc., which are conventionally used as the sizing agent for paper making, are used in an acid sizing process wherein aluminum sulfate is used for fixing to the pulp.

Accordingly, in order to solve this problem, various kinds of the so-called neutral sizing agents have been proposed, whereby sizing can be carried out in a neutral region or an alkaline region without using aluminum sulfate.

For example, addition reaction products of an olefin with maleic anhydride have been known as sizing agents which show a sizing effect due to the formation of an ester bond by reacting with a hydroxyl group in cellulose fibers.

These addition reaction products of maleic anhydride are added to paper stock in a state of an aqueous emulsion which is prepared by emulsifying, with a water, a soluble high polymer compound such as cationized starch, etc., or a surfactant such as polyoxyethylene alkylaryl ether, etc., by means of a homomixer, a homogenizer, etc. In order to obtain a good sizing effect, the addition reaction products of maleic anhydride must be dispersed in water in a state of fine particles as far as possible, and nonionic surfactants (polyoxyethylene alkylaryl ether, polyoxyethylene alkyl ether, polyoxyethylene alkyl ester, polyoxyethylene sorbitan fatty acid ester, polyoxyethylene sorbitol fatty acid ester, etc.) have been generally used as the emulsifiers. However, these nonionic surfactants are still insufficient in emulsifying property. Therefore, as a way of improving the emulsifying property, polyoxyethylene aralkylphenyl ethers represented by the general formula:

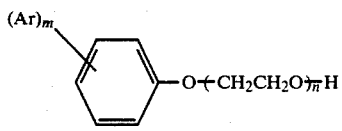

wherein Ar represents an aralkyl group; m represents an integer of 1 to 5; and n represents an integer of 10 to 80; have been proposed as nonionic surfactants in Japanese Patent Application (OPI) No. 87397/83 (the term "OPI" as used herein refers to a "published unexamined Japanese patent application"). However, these nonionic surfactants, having an end hydroxyl group, have a disadvantage in that the emulsifying property thereof deteriorates with the passage of time when they are preserved in the presence of the addition reaction products of maleic anhydride.

In order to improve this disadvantage, nonionic surfactants wherein the end hydroxyl group is substituted with an alkoxy group, an acyloxy group or an alkylcarbamoyloxy group have been proposed in Japanese Patent Application (OPI) No. 220897/83 as emulsifiers which do not lose the emulsifying property even if they are mixed with acid anhydride and allowed to stand for a long time.

Further, compounds represented by the general formula:

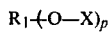

$$R_1+O-X)_p$$

wherein $R_1$ represents a residue of a polyoxyalkylene type nonionic surfactant; X represents $R_2-$, $R_2CO-$, $R_2NHCO-$ or $-CO-Q-COOM$, wherein $R_2$ represents an alkyl group having 1 to 6 carbon atoms or an aryl group; Q represents a dicarboxylic acid residue; and M represents a cation; and p represents an integer of 1 to 8; have been proposed in Japanese Patent Application (OPI) No. 30993/84.

Moreover, polyoxyethylene alkyl ether phosphoric acid esters or polyoxyethylene alkylaryl ether phosphoric acid esters represented by the general formula:

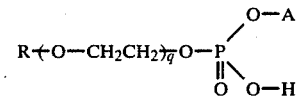

wherein R represents an alkyl group or an alkylaryl group; A represents a hydrogen atom or $R'-O-CH_2CH_2)_r$ (wherein $R'$ represents an alkyl group or an alkylaryl group, and r represents an integer of 1 or more) and q represents an integer of 1 or more; and mixtures of these phosphoric acid esters have been proposed in Japanese Patent Application (OPI) No. 28598/85.

However, the above-described emulsifiers have a disadvantage in that a satisfactory sizing effect is not obtained because the emulsifying property is not sufficient. For example, in the case of the emulsifiers disclosed in Japanese Patent Application (OPI) Nos. 220897/83 and 30993/84, there is a disadvantage in that the emulsifying property greatly deteriorates with an increase in the hardness of water to be used for emulsification, and in the case of the emulsifiers disclosed in Japanese Patent Application (OPI) No. 28598/85, although the emulsifying property in hard water is slightly improved, the emulsifying property is still insufficient and is not satisfactory.

SUMMARY OF THE INVENTION

The present invention relates to a sizing agent for paper making comprising (A) a reaction product obtained by an addition reaction of an olefin having 14 to 20 carbon atoms or a mixture thereof with maleic anhydride and (B) one or more emulsifiers selected from polyoxyalkylene aralkylaryl ether phosphoric acid esters or salts thereof.

The present invention is fundamentally different from the prior art in that an emulsifier, which has not heretofore been used for preparing the known sizing agents using an addition reaction product of an olefin and maleic anhydride, is used as the component (B) of the sizing agent, by which a good aqueous emulsion can be produced and an excellent sizing effect can be obtained. Further, it is possible to obtain a sizing agent which shows a much higher sizing effect than that in the case of using the known emulsifiers even if the hardness of the water to be used for emulsification is high. Moreover, the emulsifier in the present invention does not lose the emulsifying property if it is preserved together with an addition reaction product (A) of an olefin and maleic anhydride as a mixture for a long period of time because it does not react with the above-described addition reaction product.

DETAILED DESCRIPTION OF THE INVENTION

As the olefin having 14 to 20 carbon atoms or a mixture thereof used as a starting material of the component (A) in the sizing agent of the present invention, it is possible to use a straight chain olefin having 14 to 20 carbon atoms such as a straight chain $\alpha$-olefin, a straight chain internal olefin, etc., or a mixture thereof, or a branched chain olefin such as an oligomer of propylene, butene, etc., or a mixture thereof. In the case of olefins having 13 or less carbon atoms and 21 or more carbon atoms or mixtures thereof, the object of the present invention is not attained because a satisfactory sizing effect is not obtained.

Of the above-described various kinds of olefins, it is particularly preferred to use straight chain internal olefins from the viewpoint of the sizing effect. As the straight chain internal olefins, those prepared by known processes such as by isomerization of an $\alpha$-olefin using an acid catalyst or dehydrogenation of n-paraffin, etc., can be used, but it is particularly preferred to use those prepared by the following process so as to hardly contain residual $\alpha$-olefins or polymers.

Namely, straight chain internal olefins obtained by isomerizing straight chain $\alpha$-olefins using the so-called Ziegler catalyst composed of (C) an organic acid salt of a Group VIII transition metal such as nickel, cobalt, iron, etc., or a complex of a Group VIII transition metal and (D) an organoaluminum compound are suitable to use.

Moreover, in the case of using the emulsifier in the present invention, straight chain internal olefins which contain an olefin having a double bond in the 2-position in an amount of more than 65% by mol and do not contain olefins having a double bond in the 5- or more position, and straight chain internal olefins which contain an olefin having a double bond in the 2-position in an amount of 60% by mol or more, an olefin having a double bond in the 4-position in an amount of less than 10% by mol and olefins having a double bond in the 5- or more position in an amount of less than 5% by mol are the most suitable to use because the sizing agents showing an excellent sizing effect can be obtained easily under very mild reaction conditions by using the above-described Ziegler catalyst.

The straight chain internal olefins produced by the above-described known processes, namely, isomerization of an $\alpha$-olefin using an acid catalyst or dehydrogenation of n-paraffin using a metal catalyst, contain $\alpha$-olefins or polymers, while the straight chain internal olefins having a specified double bond distribution produced under a very mild condition using the Ziegler catalyst hardly contain the $\alpha$-olefins or the polymers.

Consequently, when the emulsifier of the present invention is used, the resulting addition reaction product of maleic anhydride produces an aqueous emulsion having much finer particles than those in the case of using the known emulsifiers, whereby a sizing agent having excellent stability after emulsification and a high sizing effect is obtained.

In a preferred embodiment of the present invention, examples of the organic acid salts of the Group VIII transition metal and the complexes of the Group VIII transition metal used as the component (C) of the catalyst for isomerizing the $\alpha$-olefin include nickel octanoate, nickel naphthenate, nickel acetate, nickel lactate, iron malonate, iron acetylacetonate, cobalt benzoate, cobalt stearate, $\pi$-allyl nickel, nickel dimethylglyoxime, nickel carbonyl, iron carbonyl, cobalt carbonyl, etc. However, those using nickel as the metal are preferable because the isomerization ability is the highest and formation of polymers is small.

In a preferred embodiment of the present invention, examples of the organoaluminum compounds used as the component (D) of the catalyst for isomerizing the $\alpha$-olefin include triethylaluminum, diethylaluminum chloride, ethylaluminum sesquichloride, ethylaluminum dichloride, etc., compounds wherein chlorine in the above-described compounds is substituted with fluorine, bromine, iodine, etc., and compounds wherein the ethyl group in the above-described compounds is substituted with an alkyl group such as a methyl group, a propyl group, etc.

In carrying out the isomerization reaction of the $\alpha$-olefin in the present invention, it is possible to add other catalyst components such as phosphine compounds, etc., in addition to the above-described isomerization catalyst components (C) and (D) to improve the catalytic activity.

The amount of the component (C) used in the above-described isomerization reaction is not particularly restricted, but it is preferred to be in a range of 0.1 to 50,000 ppm as a molar concentration of metal based on the $\alpha$-olefin. More preferably, it can be selected suitably between the range of 1 to 5,000 ppm. Further, the amount of the above-described isomerization catalyst component (D) is preferred to be 0.5 time by mol or more based on the molar number of metal in the component (C) used.

Since the Ziegler isomerization catalyst in a preferred embodiment of the present invention has a very high isomerization activity, the reaction condition can be selected between a wide range of reaction temperatures of $-20°$ C. to 200° C. However, in order to prevent formation of polymers, it is preferred to carry out the reaction in a range of 0° to 80° C.

The time necessary for isomerization is not particularly restricted and can be suitably selected according to the desired double bond distribution.

The isomerization reaction can be carried out by any of a batch process, a semibatch process and a continuous process. It is preferable to carry out the isomerization reaction under an inert gas atmosphere such as nitrogen, argon, etc., so as to avoid mixing of a large amount of air or water.

The straight chain internal olefin of the present invention obtained by an isomerization process using the so-called Ziegler catalyst in a preferred embodiment of the present invention has a characteristic that the amounts of polymers and residual $\alpha$-olefins are very small because it is produced under a mild condition using a very small amount of the catalyst. Accordingly, the addition reaction product of maleic anhydride using it has a very excellent emulsifying property and shows stability after emulsification when it is used together with the emulsifier of the present invention, as compared with the known addition reaction product of maleic anhydride using an olefin for sizing agents.

The addition reaction product of an olefin having 14 to 20 carbon atoms or a mixture thereof with maleic anhydride in the present invention is obtained by heating both of them in the absence of the catalyst at atmospheric pressure or under pressure in, preferably, an inert gas atmosphere such as nitrogen gas, etc., from 180° to 250° C. and reacting them at the same temperature for 1 to 30 hours, preferably 3 to 20 hours.

The amount of the addition reaction product of maleic anhydride used as component (A) in the sizing agent of the present invention varies more or less depending on the kind or use of the paper, but it is generally in a range of 0.05 to 3.0% by weight based on dry pulp.

The preferred polyoxyalkylene aralkylaryl ether phosphoric acid esters used as component (B) of the present invention are compounds represented by the following general formula (I):

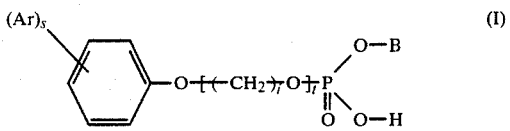

wherein Ar represents an aralkyl group; s represents an integer of 1 to 5; t represents an integer of 3 or more; i represents an integer of 2 to 4; and B represents a hydrogen atom or

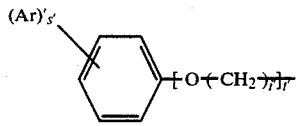

wherein (Ar)' represents an aralkyl group; s' represents an integer of 1 to 5; t' represents an integer of 3 or more; and i' represents an integer of 2 to 4.

Examples of the polyoxyalkylene aralkylaryl ether phosphoric acid esters represented by general formula (I) used as component (B) of the present invention include phosphoric acid monoesters and phosphoric acid diesters of polyoxyalkylene aralkylphenyl ethers such as polyoxyethylene monobenzylphenyl ether, polyoxyethylene dibenzylphenyl ether, polyoxyethylene tribenzylphenyl ether, polyoxyethylene monophenethylphenyl ether, polyoxyethylene diphenethylphenyl ether, polyoxyethylene triphenethylphenyl ether, etc., and mixtures of the phosphoric acid monoester and the phosphoric acid diester thereof. Further, there are phosphoric acid monoesters and phosphoric acid diesters of polyoxyalkylene aralkylaryl ethers wherein the polyoxyethylene portion in the above-described compounds is replaced with polyoxypropylene or polyoxybutylene or the phenyl group in the above-described compounds is replaced with a methylphenyl group, a dimethylphenyl group, etc., and mixtures of the phosphoric acid monoester and the phosphoric acid diester thereof.

Further, as the emulsifiers in the present invention, salts of the above-described polyoxyalkylene aralkylaryl ether phosphoric acid esters, such as sodium salt, potassium salt, ammonium salt, etc., can similarly be used.

The amount of the emulsifier used as component (B) in the sizing agent of the present invention depends on the dispersibility of the addition reaction product of maleic anhydride in water, but it is generally preferred in a range of 3 to 30% by weight, preferably 5 to 20% by weight, based on component (A).

In carrying out emulsification of component (A) in the present invention, it is possible to use, if desired, suitable surfactants such as polyoxyalkylene alkyl ether, polyoxyalkylene alkylaryl ether, polyoxyalkylene alkyl ether sulfuric acid ester or salts thereof, polyoxyalkylene alkylaryl ether sulfuric acid ester or salts thereof, polyoxyalkylene alkyl ether phosphoric acid ester or salts thereof, polyoxyalkylene alkylaryl ether phosphoric acid ester or salts thereof, etc., together with the emulsifier of component (B). The amount of them is preferred to be equal to or less than the amount of the emulsifier of the present invention which is component (B).

In the case of carrying out sizing of pulp with the sizing agent for paper making of the present invention, the sizing is generally carried out by adding the sizing agent to paper stock as an emulsion prepared by homogeneously dispersing in water.

In order to emulsify the sizing agent of the present invention in water, the addition reaction product of maleic anhydride component (A) and the emulsifier of the present invention of component (B) may be previously uniformly mixed and the resulting mixture is dispersed in water to obtain an emulsion, or component (A) and component (B) may be added separately to emulsify them. The former process is preferred over the latter process, by which it is possible to sufficiently show the characteristic of the sizing agent of the present invention that the initial emulsifying property can be kept even if component (A) and component (B) are mixed and preserved for a long period of time. In order to effectively carry out emulsification, a homomixer, a homogenizer, a high pressure emulsifying machine, etc., may be used. Sufficient emulsification can be carried out by only passing through an orifice, too. The resulting emulsion of the sizing agent can be used by adding to the paper stock in the arbitrary paper making step.

In the case that the emulsifier of the present invention is dispersed in water, it is possible to use a protective colloid which is a suspending agent, such as cationized starch, gelatin, cationic polyacrylamide or polyethylene imine.

Further, the sizing agent of the present invention may be used together with a suitable amount of various other sizing agents, as occasion demands. In the case of carrying out sizing, it is of course possible to use all fillers for paper making, such as talc, clay, titanium oxide, calcium carbonate, calcium sulfate, aluminum hydroxide, etc.

In the following, the present invention is illustrated in greater detail with reference to examples and comparative examples, but the present invention is not limited to these examples. Examples for preparing component (A) in the sizing agent of the present invention are described first.

PREPARATION EXAMPLE 1

In this example, a branched chain internal olefin is used as a starting material for the addition reaction product of maleic anhydride.

200 g of an oligomer having 16 to 20 carbon atoms (carbon atom number 16, 4% by mol; carbon atom number 17, 22% by mol; carbon atom number 18, 41% by mol; carbon atom number 19, 20% by mol; and carbon atom number 20, 12% by mol) obtained by a low grade polymerization reaction of propylene using a phosphoric acid catalyst and 75 g of maleic anhydride were placed in a stainless steel autoclave equipped with a stirrer. After the reaction system was replaced with a nitrogen atmosphere, the reaction was carried out at 215° C. for 8 hours. An unreacted olefin and maleic anhydride were removed by vacuum distillation to obtain 187 g of an addition reaction prodoct of maleic anhydride.

PREPARATION EXAMPLE 2

In this example, a straight chain α-olefin is isomerized with the so-called Ziegler catalyst to form a straight chain internal olefin which is used as a starting material for the addition reaction product of maleic anhydride.

300 g of n-hexadecene-1 and 0.008 g of nickel octanoate (molar concentration of nickel to olefin: 17 ppm) were placed in a 500 ml glass flask. After replacing the system with argon, 0.4 g (70 times by mol of nickel) of ethylaluminum sesquichloride was added with stirring, and the mixture was stirred at room temperature for 3 hours. 30 ml of a 1N aqueous solution of sodium hydroxide was added to decompose and remove the catalyst. Thus, n-hexadecene having the composition shown in Table 1 was obtained.

TABLE 1

| Component | Content (% by mol) |
| --- | --- |
| n-Hexadecene-1 | 0 |
| n-Hexadecene-2 | 84 |
| n-Hexadecene-3 | 14 |
| n-Hexadecene-4 | 2 |
| The other n-hexadecenes | 0 |

Analysis of the double bond positions in the straight chain olefins was carried out by $^{13}$C-NMR. Chemical shifts of the carbon atom in the double bond position appear in 114.2 ppm and 139.1 ppm in the case of α-olefin, 124.5 ppm and 131.8 ppm in the case of trans-2-olefin, 123.6 ppm and 131.0 ppm in the case of cis-2-olefin, 129.5 ppm and 132.0 ppm in the case of trans-3-olefin, 129.4 ppm and 131.6 ppm in the case of cis-3-olefin, 130.2 ppm and 130.7 ppm in the case of trans-4-olefin, 129.7 ppm and 130.2 ppm in the case of cis-4-olefin, 130.5 ppm in the case of 5- or more trans-olefins and 130.0 ppm in the case of 5- or more cis-olefin. The amount of olefin compositions having a double bond in the 1-position, 2-position, 3-position, 4-position and 5- or more positions can be determined from ratios of the intensity of these chemical shifts.

Further, according to gas chromatographic analysis, the amount of polymers in the isomerized oil was 0.4% by weight.

200 g of the resulting n-hexadecene was allowed to react with 80 g of maleic anhydride under the same conditions as in Preparation Example 1 to obtain 210 g of an addition reaction product of maleic anhydride.

PREPARATION EXAMPLE 3

In this example, a straight chain α-olefin is isomerized with a Ziegler catalyst in the same manner as in Preparation Example 2 to form a straight chain internal olefin which is used as a starting material for the addition reaction product of maleic anhydride.

In this example, the isomerization reaction was carried out by increasing the amount of nickel octanoate in Preparation Example 2 to 0.016 g (molar concentration of nickel to olefin: 34 ppm). Namely, 300 g of n-hexadecene-1 and 0.016 g of nickel octanoate were placed in a 500 ml glass flask. After replacing the system with argon, 0.4 g (35 times by mol of nickel) of ethylaluminum sesquichloride was added with stirring, and the mixture was stirred at room temperature for 3 hours. 30 ml of a 1N aqueous solution of sodium hydroxide was added to decompose and remove the catalyst. Thus, n-hexadecene having the composition shown in Table 2 was obtained.

The amount of polymers was 0.6% by weight.

TABLE 2

| Component | Content (% by mol) |
| --- | --- |
| n-Hexadecene-1 | 0 |
| n-Hexadecene-2 | 66 |
| n-Hexadecene-3 | 25 |
| n-Hexadecene-4 | 5 |
| The other n-hexadecenes | 4 |

200 g of the resulting n-hexadecene was allowed to react with 80 g of maleic anhydride under the same conditions as in Preparation Example 1 to obtain 213 g of an addition reaction product of maleic anhydride.

PREPARATION EXAMPLE 4

In this example, a straight chain α-olefin is isomerized with an acid catalyst to form a straight chain internal olefin which is used as a starting material for the addition reaction product of maleic anhydride.

A flow type stainless steel reactor tube was filled with 100 ml of synthetic silica alumina and kept at 150° C. n-Hexadecene was allowed to pass through this reactor tube at a flow rate of 250 ml/hour.

The polymers were contained in an amount of 5% by weight in the effluent oil from the outlet of the reactor tube. They were separated by distillation to obtain n-hexadecene having the composition shown in Table 3.

TABLE 3

| Component | Content (% by mol) |
| --- | --- |
| n-Hexadecene-1 | 8 |
| n-Hexadecene-2 | 44 |
| n-Hexadecene-3 | 25 |
| n-Hexadecene-4 | 17 |
| The other n-hexadecenes | 6 |

200 g of the resulting n-hexadecene was allowed to react with 80 g of maleic anhydride under the same conditions as in Preparation Example 1 to obtain 208 g of an addition reaction product of maleic anhydride.

PREPARATION EXAMPLE 5

In this example, a straight chain internal olefin obtained by a dehydrogenation reaction of n-paraffin is used as a starting material for the addition reaction product of maleic anhydride.

n-Hexadecane was fed together with hydrogen to a stainless steel reactor tube filled with 100 ml of a Pt-LiO$_2$-Al$_2$O$_3$ catalyst and a dehydrogenation reaction was carried out under a condition comprising a reaction temperature of 480° C., a flow rate of 50 ml/minute and hydrogen/n-paraffin: 10.0 (mol/mol). After n-hexadecane was removed using molecular sieve, the resulting n-hexadecene had the composition shown in Table 4.

TABLE 4

| Component | Content (% by mol) |
|---|---|
| n-Hexadecene-1 | 5 |
| n-Hexadecene-2 | 13 |
| n-Hexadecene-3 | 18 |
| n-Hexadecene-4 | 22 |
| The other n-hexadecenes | 42 |

200 g of the resulting n-hexadecene was allowed to react with 80 g of maleic anhydride under the same conditions as in Preparation Example 1 to obtain 200 g of an addition reaction product of maleic anhydride.

EXAMPLE 1

Using the addition reaction products of maleic anhydride in Preparation Examples 1 to 5 and emulsifiers of the present invention or comparative emulsifiers, sizing agents of the present invention or comparative sizing agents were prepared, and they were subjected to a sizing test.

As the emulsifiers of the present invention, (a) polyoxyethylene diphenethylphenyl ether phosphoric acid ester (mixture of monoester and diester, polyoxyethylene: n=12) and (b) polyoxyethylene diphenethylphenyl ether phosphoric acid ester (mixture of monoester and diester, polyoxyethylene: n=8) were used. As the comparative emulsifiers, (a′) polyoxyethylene nonylphenyl ether (polyoxyethylene: n=100), (b′) polyoxyethylene diphenethylphenyl ether (polyoxyethylene: n=12) (refer to Japanese Patent Application (OPI) No. 87397/83) and (c′) polyoxyethylene nonylphenyl ether phosphoric acid ester (mixture of monoester and diester, polyoxyethylene: n=10) (refer to Japanese Patent Application (OPI) No. 28598/85) were used. The method of testing is as follows.

0.5 g of the above-described emulsifier was added to 10 g of the addition reaction product of maleic anhydride. After they were mixed well, the mixture was allowed to stand at a temperature of 50° C. for 1 month. To 0.5 g of this mixture, 99.5 g of water was added to emulsify by a homomixer. The resulting emulsion was added to a 1% pulp slurry (L.B.KP., 430 ml C.S.F.) in such an amount that the addition reaction product of maleic anhydride was 0.1 or 0.2% by weight (based on pulp solid content). Thereafter, 0.8% by weight (based on the pulp solid content) of cationized starch and 0.03% by weight (based on the pulp solid content) of cationic polyacrylamide were added with stirring, and paper making was carried out by a TAPPI standard sheet machine in a conventional manner so as to have a real weight of 60±1 g/m$^2$. The filler used was calcium carbonate, which was used in an amount of 20% by weight (based on the pulp solid content). Water used in the present example was city water (total hardness: 30 ppm).

Then, the resulting wet paper was dehydrated by pressing, dried by heating to 105° C. for 3 minutes by means of a rotary dryer, and conditioned at 20° C. and a relative humidity of 65% for 24 hours.

The sizing degree of the resulting hand-made paper was measured by a Stöckigt sizing degree testing method according to JIS P 8122. The results obtained are shown in Table 5.

TABLE 5

| | Stockigt Sizing Degree (second) | | | | | | | | | |
|---|---|---|---|---|---|---|---|---|---|---|
| | Sizing Agent of The Invention | | | | Comparative Sizing Agent | | | | | |
| | Emulsifier | | | | | | | | | |
| | (a) | | (b) | | (a′) | | (b′) | | (c′) | |
| | 0.1* | 0.2* | 0.1* | 0.2* | 0.1* | 0.2* | 0.1* | 0.2* | 0.1* | 0.2* |
| Addition Reaction Product of Maleic Anhydride | | | | | | | | | | |
| Preparation Example 1 | 1 | 6 | 1 | 8 | 0 | 0 | 0 | 0 | 0 | 3 |
| Preparation Example 2 | 5 | 24 | 6 | 26 | 0 | 2 | 0 | 3 | 3 | 17 |
| Preparation Example 3 | 7 | 27 | 8 | 28 | 0 | 3 | 0 | 5 | 5 | 20 |
| Preparation Example 4 | 3 | 20 | 3 | 21 | 0 | 1 | 0 | 2 | 2 | 14 |
| Preparation Example 5 | 4 | 23 | 5 | 25 | 0 | 2 | 0 | 3 | 2 | 16 |

Note:
*Amount of sizing agent added (% by weight)

As is apparent from the results shown in Table 5, in the case of preserving at 50° C. for 1 month, the sizing agents using the known nonionic emulsifiers having an end hydroxyl group are hardly emulsified and show a poor sizing effect, but those using the emulsifiers of the present invention show a good sizing effect. Further, with respect to the phosphoric acid ester type emulsifiers, in the case of using polyoxyalkylene aralkylaryl ether phosphoric acid ester, which is the emulsifier of the present invention, a higher sizing effect is obtained than in the case of using polyoxyalkylene alkylaryl ether phosphoric acid ester. Further, the most excellent sizing effect is obtained in the case of using the addition reaction products of maleic anhydride in Preparation Example 2 and Preparation Example 3 wherein a straight chain internal olefin produced by an isomerization process using the so-called Ziegler catalyst is used as a starting material.

EXAMPLE 2

In this example, an addition reaction product of maleic anhydride and an emulsifier were mixed similarly as in Example 1 and the resulting mixture was immediately emulsified in industrial water (the total hardness: 80 ppm). The sizing effect was evaluated under the same conditions as in Example 1. The results obtained are shown in Table 6.

TABLE 6

|  | Stockigt Sizing Degree (second) | | | | | | | | |
|---|---|---|---|---|---|---|---|---|---|
|  | Sizing Agent of The Invention | | | | Comparative Sizing Agent | | | | |
|  | Emulsifier | | | | | | | | |
|  | (a) | | (b) | | (a') | | (b') | | (c') | |
|  | 0.1* | 0.2* | 0.1* | 0.2* | 0.1* | 0.2* | 0.1* | 0.2* | 0.1* | 0.2* |
| Addition Reaction Product of Maleic Anhydride | | | | | | | | | | |
| Preparation Example 1 | 1 | 5 | 1 | 7 | 0 | 0 | 0 | 3 | 0 | 3 |
| Preparation Example 2 | 3 | 22 | 5 | 24 | 2 | 15 | 2 | 16 | 2 | 15 |
| Preparation Example 3 | 5 | 25 | 6 | 26 | 4 | 17 | 4 | 20 | 5 | 19 |
| Preparation Example 4 | 3 | 17 | 3 | 19 | 2 | 11 | 2 | 13 | 2 | 13 |
| Preparation Example 5 | 3 | 19 | 4 | 21 | 2 | 14 | 3 | 15 | 2 | 15 |

Note:
*Amount of sizing agent added (% by weight)

It is understood from the results shown in Table 6 that the sizing agents of the present invention shown an excellent sizing effect and have an excellent hard water resisting property.

As is demonstrated above, the present invention has the following excellent effects.

(1) Polyoxyalkylene aralkylaryl ether phosphoric acid ester or a salt thereof which is component (B) of the sizing agent of the present invention has a particularly excellent emulsifying property and shows the highest sizing effect of all phosphoric acid ester type emulsifiers.

(2) The emulsifier which is component (B) of the sizing agent of the present invention shows an excellent sizing effect even after it was preserved together with an addition reaction product of maleic anhydride of component (A) for a long period of time in a mixed state, and it shows a good sizing effect in even the case of using water having a high hardness for emulsifying.

(3) If a straight chain internal olefin produced by isomerizing a straight chain α-olefin with the so-called Ziegler catalyst is used as a starting material of component (A) in the present invention, the emulsifying property is very excellent and a high sizing effect is obtained.

While the invention has been described in detail and with reference to specific embodiments thereof, it will be apparent to one skilled in the art that various changes and modifications can be made therein without departing from the spirit and scope thereof.

What is claimed is:

1. A sizing agent for paper making comprising (A) a reaction product obtained by an addition reaction comprising heating an olefin having 14 to 20 carbon atoms or a mixture thereof with maleic anhydride in the absence of a Ziegler catalyst at atmospheric pressure or higher pressure in an inert gas atmosphere and (B) one or more emulsifiers selected from polyoxyalkylene aralkylaryl ether phosphoric acid esters or salts thereof, wherein said polyoxyalkylene aralkylaryl either phosphoric acid esters are compounds represented by the following general formula (I):

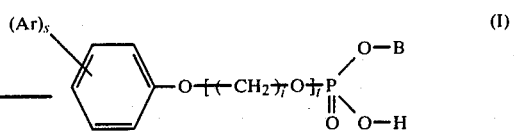

wherein Ar represents an aralkyl group; s represents an integer of 1 to 5; t represents an integer of 3 or more; i represents an integer of 2 to 4; and B represents a hydrogen atom or

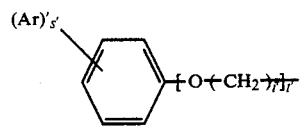

wherein (Ar)' represents an aralkyl group; s' represents an integer of 1 to 5 and t' represents an integer of 3 or more; and i' represents an integer of 2 to 4.

2. A sizing agent for paper making according to claim 1, wherein the one or more emulsifiers (B) does not react with the reaction product (A) when preserved over time together with the reaction product (A).

3. A sizing agent for paper making according to claim 1, wherein said olefin having 14 to 20 carbon atoms or a mixture thereof is a straight chain internal olefin or a mixture thereof obtained by isomerizing a straight chain α-olefin having 14 to 20 carbon atoms or a mixture thereof, using a catalyst composed of (C) an organic acid salt of a Group VIII transition metal or a complex of a Group VIII transition metal and (D) an organoaluminum compound.

4. A sizing agent for paper making according to claim 3, wherein said straight chain internal olefin or a mixture thereof contains an olefin having a double bond in the 2-position in an amount of more than 65% by mol and does not contain olefins having a double bond in the 5- or more position.

5. A sizing agent for paper making according to claim 3, wherein said straight chain internal olefin or a mixture thereof contains (I) an olefin having a double bond in the 2-position in an amount of 60% by mol or more, (II) an olefin having a double bond in the 4- position in an amount of less than 10% by mol, and (III) olefins having a double bond in the 5- or more position in an amount of less than 5% by mol.

6. A sizing agent for paper making according to claim 3, wherein said Group VIII transition metal is nickel.

7. A sizing agent for paper making according to claim 3, wherein component (C) is employed in an amount of 0.1 to 50,000 ppm as a molar concentration of metal based on the α-olefin and component (D) is employed in an amount of 0.5 time by mol based on the molar number of metal in component (C).

8. A sizing agent for paper making according to claim 7, wherein component (C) is employed in an amount of 1 to 5,000 ppm as a molar concentration of metal based on the α-olefin and component (D) is employed in an amount of 0.5 time by mol based on the molar number of metal in component (C).

9. A sizing agent for paper making according to claim 1, wherein component (B) is employed in an amount of from 3 to 30% by weight based on component (A).

10. A sizing agent for paper making according to claim 9, wherein component (B) is employed in an amount of from 5 to 20% by weight based on component (A).

11. A sizing agent for paper making according to claim 1, wherein component (A) is employed in an amount of from 0.05 to 3% by weight based on dry pulp.

12. A sizing agent for paper making according to claim 1, wherein the inert gas atmosphere is nitrogen gas or argon gas.

13. A sizing agent for paper making according to claim 1, wherein the addition reaction is carried out at atmospheric pressure.

14. A sizing agent for paper making according to claim 1, wherein the addition reaction is carried out under pressure greater than atmospheric pressure.

15. A sizing agent for paper making according to claim 1, wherein the addition reaction is carried out from 180° to 250° for 1 to 30 hours.

16. A sizing agent for paper making according to claim 1, wherein the reaction product (A) and the one or more emulsifiers (B) are used in amounts such that a good aqueous emulsion is produced and an excellent sizing effect can be obtained.

17. A sizing agent for paper making according to claim 16, wherein the one or more emulsifiers (B) does not loose its emulsifying property when preserved over time together with the reaction product.

18. A sizing agent for paper making according to claim 11, wherein component (B) is employed in an amount of from 3 to 30% by weight based on Component (A).

19. A sizing agent for paper making according to claim 11, wherein component (B) is employed in an amount of from 5 to 20% by weight based on Component (A).

20. A sizing agent for paper making according to claim 18, wherein the inert gas atmosphere is nitrogen gas.

* * * * *